United States Patent [19]

Valenta et al.

[11] Patent Number: 5,196,473
[45] Date of Patent: Mar. 23, 1993

[54] GRANULES EXHIBITING REDUCED DUSTING

[75] Inventors: Rudolph C. Valenta, Buffalo Grove; Leslie C. Giron, Elmhurst, both of Ill.

[73] Assignee: Oil-Dri Corporation of America, Chicago, Ill.

[21] Appl. No.: 316,861

[22] Filed: Feb. 28, 1989

[51] Int. Cl.⁵ .............................................. C08K 3/34
[52] U.S. Cl. .................................. 524/445; 524/433; 524/447; 524/448; 523/200; 428/404; 252/383; 252/384
[58] Field of Search ................ 524/445, 433, 447, 448; 428/404; 252/383, 384; 523/200

[56] References Cited

U.S. PATENT DOCUMENTS

| | | | |
|---|---|---|---|
| 3,267,065 | 8/1966 | Shaler, Jr. et al. | 521/25 |
| 4,338,241 | 7/1982 | Ito et al. | 523/200 |
| 4,417,992 | 11/1988 | Bhattacharyya et al. | 252/88 |

*Primary Examiner*—Paul R. Michl
*Assistant Examiner*—John J. Guarriello
*Attorney, Agent, or Firm*—Dressler, Goldsmith, Shore, Sutker & Milnamow, Ltd.

[57] ABSTRACT

The present invention is directed to substantially dust-free granules. The granules are constituted by a normally dusty inorganic solid material and a water-dispersible nonionic vinyl polymer distributed thereon. The vinyl polymer promotes retention of dust size particles to the granules of the inorganic solid material.

12 Claims, 4 Drawing Sheets

DUST INDEX AFTER DRYING

GRANULES EXHIBITING REDUCED DUSTING

TECHNICAL FIELD

This invention relates to means for dust abatement for normally dusty materials. In particular, the present invention is directed to substantially dust-free granules constituted by a normally dusty inorganic solid material and a water-dispersible vinyl polymer. A method of producing such granules is also disclosed.

BACKGROUND OF THE INVENTION

Dust generated from particulate materials creates many problems. In industry, dust can be a health hazard due to skin contact, ingestion of the dust by breathing, and/or explosion and fire hazards. Dust can also be a nuisance as when it settles in undesirable locations as a dusty material is dispersed or otherwise handled.

Particles having a size less than about 250 micrometers, i.e., passing through a 60 mesh U.S. Standard Sieve Series screen, are defined as dust. See, Goss et al. "A Technique for Dust Measurement", Pesticide Formulations and Application Systems: Eighth Volume, American Society for Testing and Materials (ASTM), 1989, pp. 98–103, p. 99.

Many attempts have been made to bind the dust in some manner and to control it to some extent. For example, attempts have been made to allay dust by misting water in the air so as to maintain an excess of humidity in the area; however, this particular expedient is not always available, and is undesirable with absorbent solids. Oils have also been used on some materials to alleviate the dust problem. Such methods are inapplicable when it is desired that the material be substantially dry as with sorptive materials because the addition of water or oil also reduces the sorption capability of the material. Moreover, water- or oil-treated dusty materials have a relatively short shelf life.

An alternative method of controlling dust is to pelletize the material by forming a fluid paste by with a binder and then extruding the paste. Typically, the produced pellets are dense and strong. However, pellets are undesirable when a material having a relatively large surface is desired, because pelletizing reduces the surface area of the material. Moreover, pelletizing adds to the cost of the final product.

Polytetrafluoroethylene (PTFE) resins also can be utilized to control dust. See, for example, U.S. Pat. No. 3,993,584 to Owen et al. However, use of PTFE in many situations is undesirable because PTFE is costly, a heating step is required, and the applied PTFE cannot be later dissolved away.

The present invention provides substantially dust-free granules of a normally dusty inorganic solid material by distributing a relatively small amount of a vinyl polymer thereon. Dusting is reduced while maintaining the sorption capabilities of the inorganic solid material. Moreover, the present granules have a much better shelf life than similar granules treated with oil or water for purposes of dust abatement. The shortcomings of the aforementioned prior art dust abatement methods and compositions are thereby overcome, or at least minimized.

SUMMARY OF THE INVENTION

The present invention contemplates substantially dust-free granules that include a normally dusty inorganic solid material and a water-dispersible nonionic vinyl polymer distributed on the granules. The term "water-dispersible" as used herein denotes vinyl polymers that are water-dispersible or water-soluble. The distributed amount is sufficient to reduce dusting but is less than an amount that interferes with the intended end use of the inorganic solid material in granular form.

The major constituent of the individual granules is the inorganic solid material. The size distribution of the inorganic solid material can vary, but includes granules as well as dust size particles retained thereon.

A particulate absorbent inorganic solid material, such as an absorbent clay, can be effectively rendered substantially dustless by practicing the present invention without a material reduction in the absorbent capacity of such material.

The minor constituent of the substantially dust-free granules is the water-dispersible, nonionic vinyl polymer. The vinyl polymer promotes retention of dust size particles by the granules, thereby reducing the Dust Index of the granules. The dust size particles that are present are bound to each other and/or to the granules of inorganic material by the vinyl polymer. By retaining the dust size particles in this manner, the opportunity for the dust size particles that are present to become airborne as the material is handled is substantially reduced.

Suitable such vinyl polymers have a vinyl backbone and secondary pendant groups extending from the vinyl backbone. The pendant groups present do not adversely affect the water-dispersibility characteristic of the vinyl polymer, however.

The present invention also contemplates a method of producing substantially dust-free absorbent granules such as, for example, particulate industrial absorbents, animal litter, and the like. The contemplated method includes distribution of the vinyl polymer, usually as an aqueous solution or suspension, onto the normally dusty inorganic solid material to produce the substantially dust-free granules. The vinyl polymer is preferably sprayed in an aqueous vehicle onto the particulate inorganic solid material. Agitation, such as tumbling, of the solid material during spraying disperses the vinyl polymer onto the inorganic solid material.

DESCRIPTION OF PREFERRED EMBODIMENTS

Figure 1:
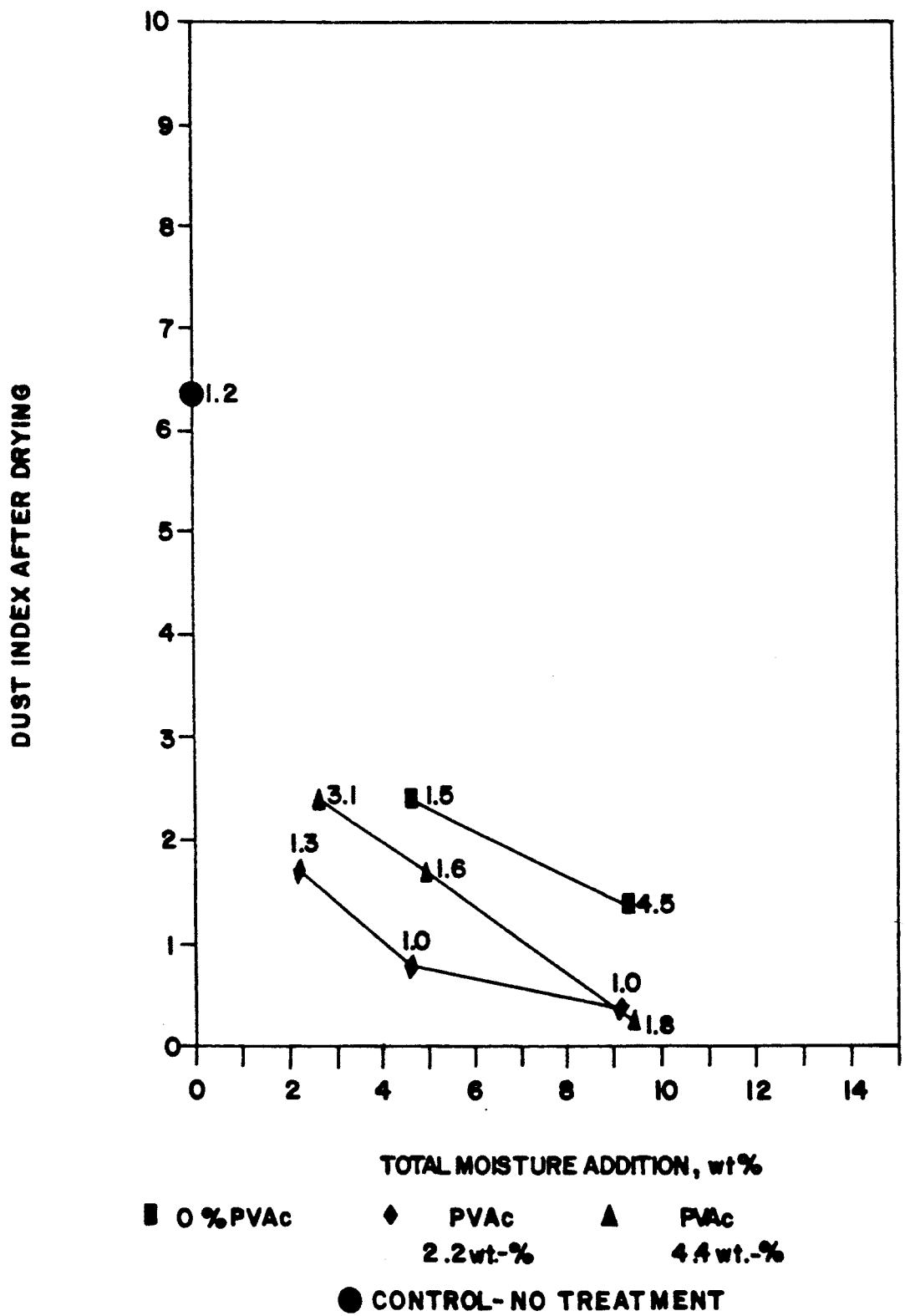
FIG. 1 is a graphical representation of Dust Index after drying as a function of total moisture addition at varying amounts of vinyl polymer for a particulate calcium bentonite clay.

Although this invention is susceptible to embodiment in many different forms, some preferred embodiments of the invention will be discussed in detail. It should be understood, however, that the present disclosure is to be considered as an exemplification of the principles of this invention and is not intended to limit the invention to the embodiments illustrated.

The product of the present invention is substantially dust-free granules that have a reduced tendency to generate dust upon handling. These granules include a normally dusty particulate inorganic solid material and a water-dispersible nonionic vinyl polymer distributed on the particulate inorganic solid material in an amount sufficient to reduce dusting of that inorganic material.

The present, vinyl polymer-treated granules are free-flowing and have the inorganic solid material as the major constituent. The inorganic solid material includes granules as well as dust size particles.

The inorganic solid material useful in the present invention can be an absorbent clay in discrete, finely divided and free-flowing form such as a comminuted clay and the like. The so-called Fuller's earth also is an illustrative absorbent material the dusting tendencies of which can be readily abated utilizing the present invention.

Fuller's earth, also referred to herein as Fuller's earth or Fuller's clay, is a natural, earthy material composed primarily of hydrous aluminum silicates, although small amounts of non-clay materials can also be present.

Typical absorbent clays that benefit from practicing this invention are montmorillonite, kaolinite, illite, halloysite, smectite, hormite, vermiculite, the sodium and calcium bentonites (clays largely composed of montmorillonite but which can also contain beidellite, attapulgite, and similar minerals), mica, attapulgite, sepiolite, mixtures thereof and the like. Calcium bentonite and hormite are particularly preferred clays for the present purposes.

Calcium bentonites can range in color from a cream, off-white to a dark reddish tan color and are frequently referred to in the trade under designations such as Mississippi Brown (MB) and Mississippi White (MW). Typical hormites are Georgia Brown (GB) and Georgia White (GW).

The water-dispersible nonionic vinyl polymer useful in practicing the present invention promotes adhesion of the dust size particles to each other and to the granules of the inorganic solid material. A substantially dust-free agglomerate is thereby produced.

The vinyl polymer has pendant groups that extend from the vinyl backbone. The pendant group can be hydroxy, acetate, pyrrolidonyl, substituted pyrrolidonyl, mixtures thereof and the like.

Illustrative of the vinyl polymers contemplated herein are polyvinyl alcohol, polyvinyl esters such as polyvinyl acetate, polyvinylpyrrolidone, polyvinyloxazolidone, polyvinylmethyloxazolidone, copolymers thereof, and mixtures thereof. Partially hydrolyzed polyvinyl acetate polymers are also suitable.

Preferred vinyl polymers include polyvinyl acetate, partially hydrolyzed polyvinyl acetate, and mixtures thereof.

The vinyl polymer suitable for present purposes preferably has a number average molecular weight of about 10,000 to about 300,000 daltons, more preferably about 30,000 to about 150,000 daltons. The particle size of the vinyl polymer in an aqueous dispersion can vary, but usually is in the range of about 0.4 micrometers to about 5 micrometers, preferably in the range of about 0.8 micrometers to about 1 micrometer.

The amount of vinyl polymer present in the granules is that amount that is effective to substantially reduce the Dust Index of the inorganic solid material, i.e., to reduce the Dust Index by at least about 75 percent. The vinyl polymer is preferably present in an amount less than about 0.25 weight percent, more preferably in an amount in the range of about 0.05 to about 0.15 weight percent, based on the weight of the granules. Absorbent clay granules bearing the foregoing amounts of the vinyl polymer are particularly well suited as animal litter and industrial oil and water absorbents.

Suitable illustrative vinyl polymers include an aqeuous polyvinyl acetate emulsion available from The Borden Co., New York, N.Y., under the trade designation "Elmer's Glue-all" (about 44 wt-percent solids) and a vinyl acetate homopolymer emulsion containing polyvinyl alcohol as the protective colloid and available from Union 76, Union Chemicals Division, Rolling Meadows, Ill. under the trade designations "76 RES 202A", "76 RES 202AH", and "76 RES 202 AM" (each having about 55 wt-percent solids).

The vinyl polymer is distributed on the inorganic solid material in an aqueous vehicle such as water. In some instances a $C_1$ to $C_4$ lower aliphatic alcohol may be added to the aqueous vehicle to enhance distribution of the vinyl polymer onto the inorganic material. In addition to the vinyl polymer, the aqueous solution or suspension of the vinyl polymer may contain conventional additives such as plasticizers, protective colloids, and the like.

The water that remains present in the granules may also help to promote hydrogen bonding of the dust-size particles to each other as well as to the granules of the inorganic solid material.

The weight ratio of water to vinyl polymer in the aqeuous dispersions, including solutions, used for the present purposes is preferably about 2:1 to about 75:1, more preferably about 25:1 to about 50:1, respectively.

The aqueous vinyl polymer solution or emulsion is then distributed onto the inorganic solid material. Distribution can be achieved in a variety of ways. Illustrative methods of distribution include spraying or sprinkling, followed by manual agitation, mechanical mixing, and the like expedients.

A preferred method of vinyl polymer distribution onto the granules includes generating a cascade of particulate inorganic solid material and spraying the selected vinyl polymer solution or emulsion into the cascade. The resulting treated material is then mixed, e.g., tumbled, to produce the substantially dust-free granules. The granules may then be dried, if desired, to lower the free moisture content (FMC). The FMC, expressed as a weight percent, is the difference between the initial weight of a sample and the weight of the sample after the moisture has been removed.

The cascade and mixing can be achieved in a conventional rotary tumbling device in which the granules are contained as the aqueous vinyl polymer solution or emulsion is sprayed thereon.

The Dust Index of produced granules was measured using the apparatus disclosed in Goss et al., "A Technique for Dust Measurement", Pesticide Formulations and Application Systems: Eighth Volume, American Society for Testing and Materials (ASTM), 1989, pp. 98–103. However, for present purposes, the dust sampling portions of the apparatus were eliminated. Only light transmission was measured to determine the Dust Index, however.

The light source utilized was a 7.5 watt tungsten bulb mounted in a 6 inch (in.) reflector to one side of the instrument and about 14.5 in. above the base. The light source was arranged so as to shine through a 7/16 in. hole in a wall of the instrument. A cadmium sulfide photocell was positioned 2 in. from a facing wall at a level opposite the hole. The photcell utilized is commercially available from Archer Co. under the trade designation 276-116A.

A circuit including the photocell was completed by connecting, in series, a 100 k Ohm linear taper potentiometer, a 7.5 volt battery and a 0–50 microammeter.

The procedure utilized was as follows. The instrument was cleaned of residual dust. The meter was adjusted to read 50 microamperes ($\mu a$) using the potentiometer. The 50 $\mu a$ reading was used to indicate 100% light transmission which also indicates 0% absorption.

A 2000 gram sample of the material whose Dust Index was to be determined was poured through a funnel into the instrument. The meter was read 5 seconds after the last of the material had been dispensed from the funnel. The meter reading was used as the dust instrument reading.

The Dust Index was calculated using the following equation:

$$\text{Dust Index} = -Log\ (Y/50)/-Log(10/50) \times 10$$

wherein Y equals the dust instrument reading expressed in microamperes.

The lower the numerical value of the Dust Index, the lower the amount of dust that can be generated, and thus less dusty the tested agglomerate.

The Dust Index of a substantially dust-free granules, as the term is used herein, is about 25 percent or less of the Dust Index of the same particulate, normally dusty inorganic solid material prior to distribution of the vinyl polymer thereon.

Figure 2:
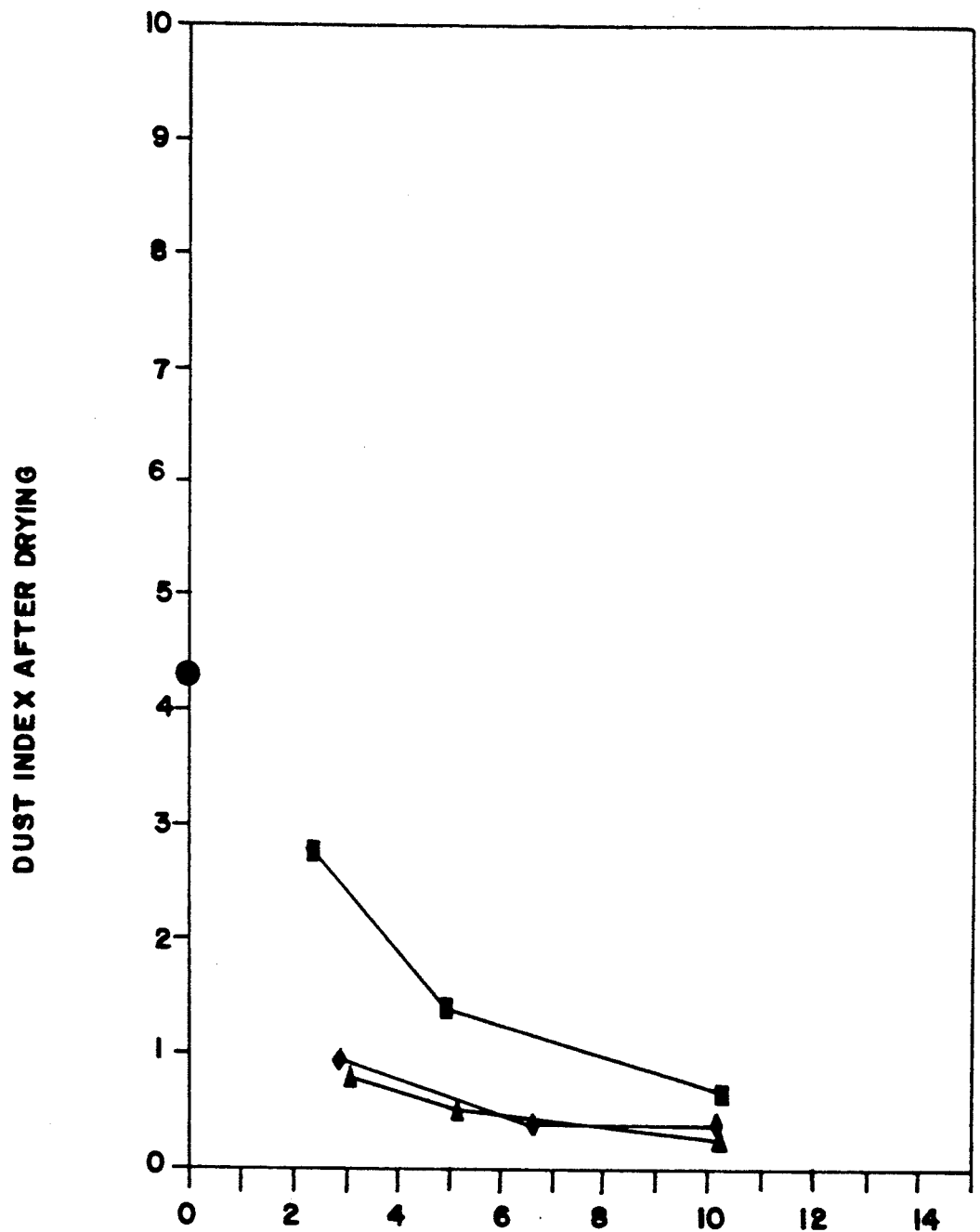
FIG. 2 is a graphical representation of Dust Index after drying as a function of total moisture addition at varying amounts of vinyl polymer for a particulate calcium bentonite clay.
Figure 3:
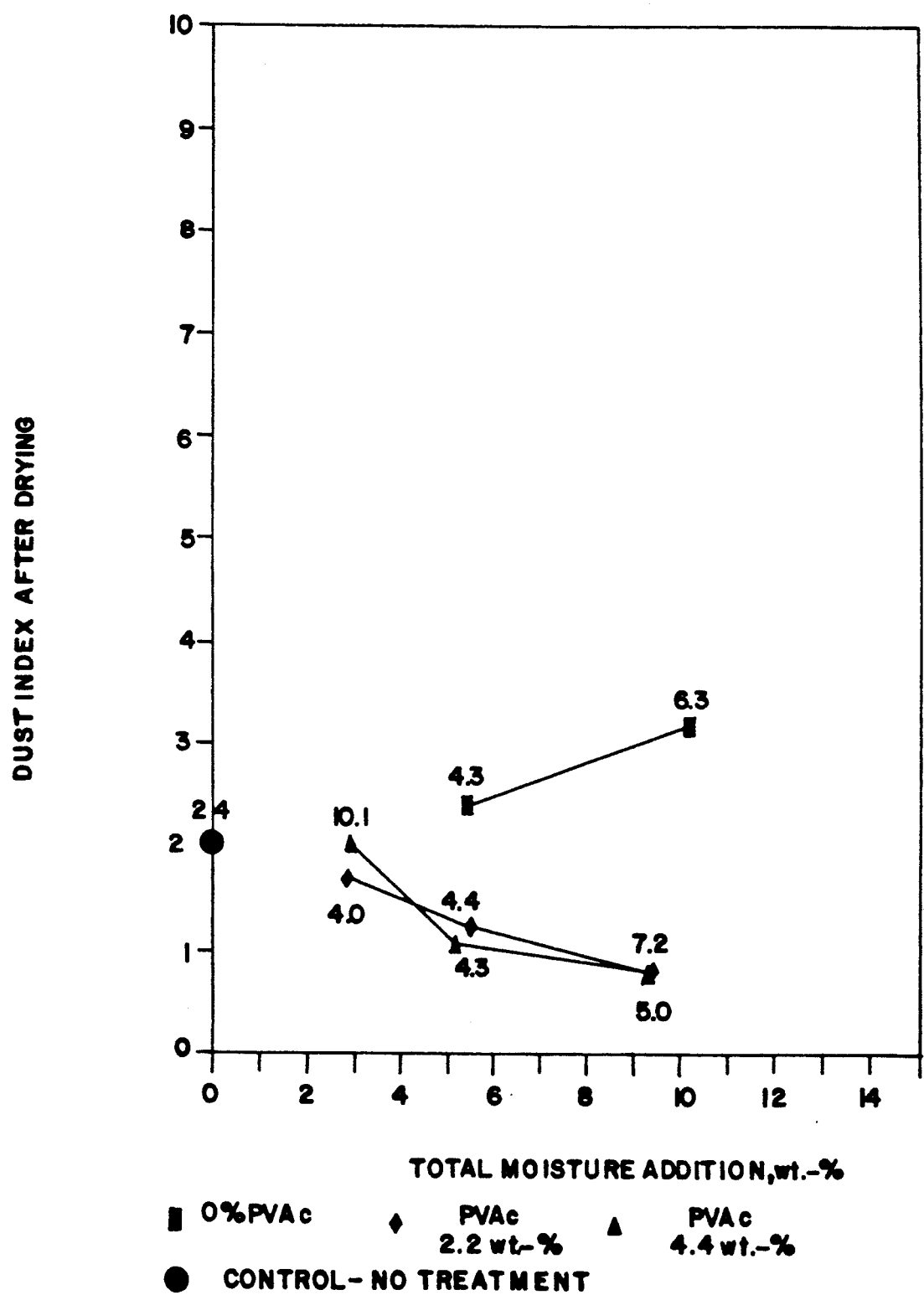
FIG. 3 is a graphical representation of Dust Index after drying as a function of total moisture addition at varying amounts of vinyl polymer for a particulate hormite clay.
Figure 4:
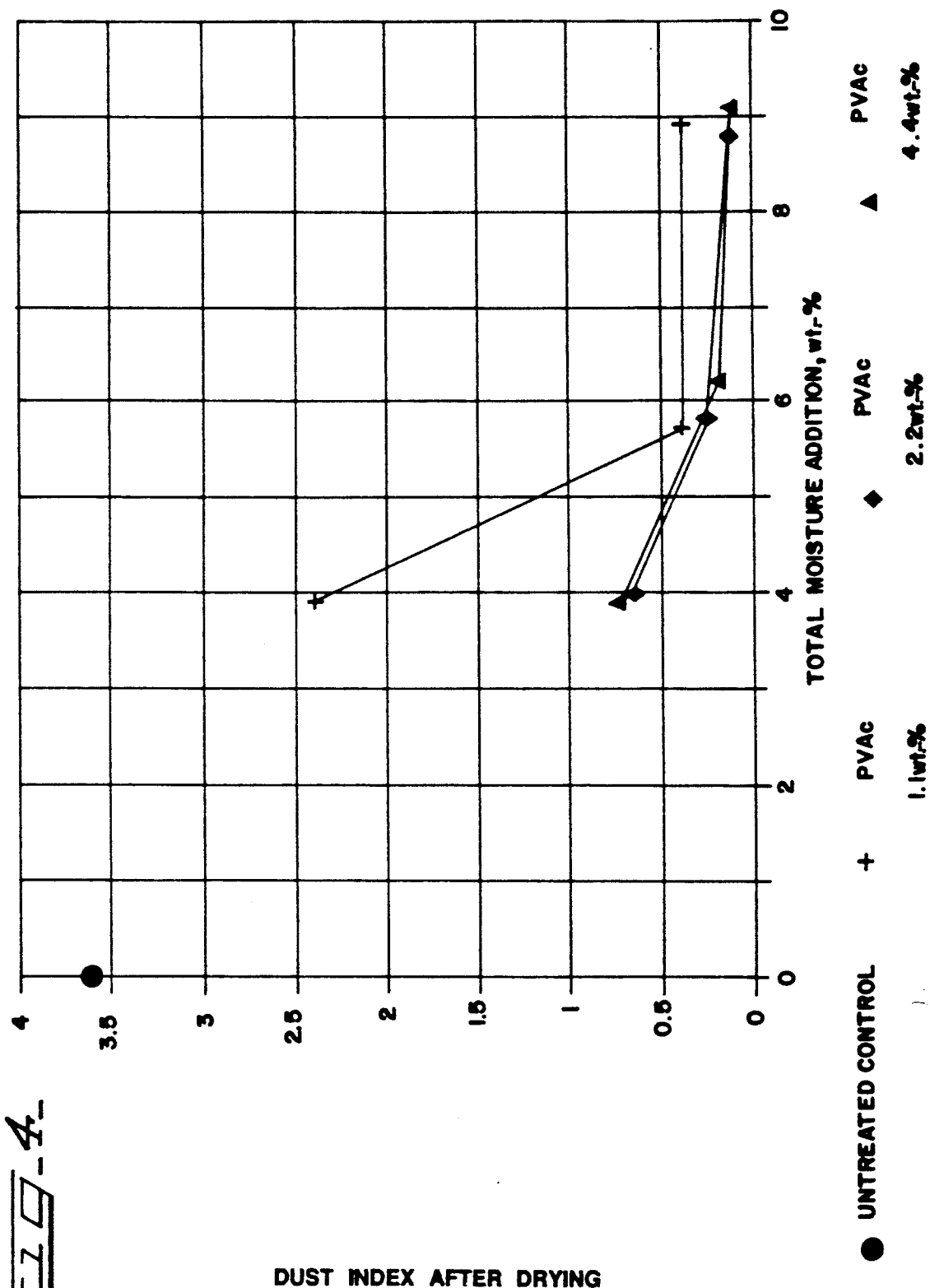
FIG. 4 is a graphical representation of Dust Index after drying as a function of total moisture addition in the presence of varying amounts of a vinyl polymer for a particulate calcium bentonite clay.

FIGS. 2–4 are graphical representations of Dust Index reduction after drying of the granules as a function of total moisture addition to the granules, expressed as a weight percent (wt.-%).

An untreated control sample (●) and three treated samples of granules were compared. The samples were treated with water (■) in different amounts to obtain various total moisture addition levels or with a 2.2 weight percent solids aqueous polyvinyl acetate emulsion (♦) or with a 4.4 weight percent solids aqueous polyvinyl acetate emulsion (▲), thus providing comparisons at various total vinyl polymer and moisture addition levels.

The inorganic solid materials utilized were various clays in particulate form.

The aqueous polyvinyl acetate emulsion utilized was a 44 weight percent solids emulsion available under the trade designation "Elmer's Glue-all", from The Borden Co., New York, N.Y.

The samples were treated using spray application of the liquid, i.e., water or aqueous polyvinyl acetate emulsion, in a rotary tumbling device.

The control and treated samples were then dried. The drying of the controls and treated samples used to obtain data presented in FIGS. 2, 3 and 4 was performed at a temperature of about 105° C. for a time period of about 18 hours. These drying conditions regarding the controls and samples used to obtain the data presented in FIG. 4 were ineffective at lowering the FMC to the desired degree as discussed hereinafter.

The number, if any, next to a data point on a graph indicates the Free Moisture Content (FMC) of the control sample or treated sample represented by that data point.

The inorganic solid material whose Dust Index is presented in FIG. 1 was a calcium bentonite clay commercially available from Oil-Dri Corp. of America, Chicago, Ill. under the trade designation RVM-MS.

The Dust Index of this clay as supplied was about 2.4 to about 3.0 at a free moisture content of 9.9 wt %.

As shown in FIG. 1, the control sample (●) of the same clay at a free moisture content of 1.2 wt-% had a relatively high Dust Index, i.e., greater than 6. While the samples treated with water alone (■) did exhibit a reduced Dust Index, the reduction was not as great as for the granules of the samples treated with the polyvinyl acetate (PVAc) emulsions. On the other hand, the 2.2 weight percent PVAc-treated sample (♦) exhibited a Dust Index equal to, or superior to that of the 4.4 weight percent PVAc-treated sample (▲) regardless of the total moisture addition thereto.

The inorganic solid material whose Dust Index is presented in FIG. 2 was another particulate calcium bentonite clay.

The Dust Index of this clay as supplied was about 2.2 at a FMC of about 12 wt-%. The FMC of each of the control and treated samples after drying was 0 wt-%.

The Dust Indices for each of the PVAc treated granule samples are seen to be superior to those of the water treated sample granules and far superior to the Dust Index of the control or untreated sample granules.

The inorganic solid material whose Dust Index is presented in FIG. 3 was a particulate hormite clay (Georgia White).

The Dust Index of this particular clay as supplied was about 2.5 to about 3.0 at a FMC of about 7.7 wt-%.

The previously discussed drying treatment was found to be ineffective in lowering the FMC to the desired degree. However, the results of the analysis are deemed acceptable for comparison purposes.

FIG. 3 shows that for a given total moisture addition level, granules having varying concentrations of polyvinyl acetate thereon nevertheless exhibit similar Dust Index values. Furthermore, the polyvinyl acetate emulsion-treated granule samples exhibit a better, i.e., lower, Dust Index than the water treated granule samples.

However, it is noted that the granules treated with the 4.4 wt-% solids aqueous polyvinyl acetate emulsion (▲) that added about 2.5 wt-% total moisture to the granules and the control sample (●) each have a Dust Index of about 2. The performance anomaly by this granule sample is presently believed to be due to a relatively poorer distribution of the polyvinyl acetate thereon.

FIG. 4 is a graphical representation of Dust Index comparisons for a particulate calcium bentonite clay after treating with a polyvinyl acetate emulsion and drying in a rotary drum as a function of total moisture addition.

An untreated control sample (●) was compared to the polyvinyl acetate-treated samples as well. The granule samples were treated with a 1.1 weight percent solids aqueous polyvinyl acetate emulsion (+), a 2.2 weight percent solids aqueous polyvinyl acetate emulsion (♦) or a 4.4 weight percent solids aqueous polyvinyl acetate emulsion (▲), thus providing various polymer as well as total moisture addition levels.

The Dust Index of this clay as supplied was about 3.2 at a FMC of about 7 wt-%.

All of the foregoing granule samples were treated using spray application with agitation in a rotary tumbling device as discussed previously hereinabove.

Drying of the control sample and treated samples was effected at a temperature of about 105° C. for a time period of about 18 hours.

The FMC of the dried control sample and treated samples was about 0 wt-%.

It will be noted that the control sample (●) had the highest observed Dust Index, and that the treatment with a polyvinyl acetate substantially reduced the Dust Index.

FIG. 4 further shows that the granules wherein the total moisture addition was greater than about 5.5 wt-% all exhibited Dust Indices of less than 0.5 regardless of the amount of polyvinyl acetate distributed thereon. However, the polyvinyl acetate-treated granule samples had a substantially longer shelf life while having the reduced Dust Index.

The granules of the samples treated with 2.2 weight percent solids (♦), and 4.4 weight percent solids (▲) aqueous polyvinyl acetate emulsions showed relatively lower Dust Indices than the particles of the sample treated with 1.1 weight percent solids (+) aqueous polyvinyl acetate emulsion at the relatively low total moisture addition of about 4 weight percent.

EXAMPLE

Preparation of Particulate Absorbent Clay With Reduced Dusting Tendency

Particulate hormite clay (2600 grams; Georgia White; Dust Index about 3.5) was sprayed with an aqueous polyvinyl acetate emulsion (132 grams; 76 RES 202A; solids content about 2.2 wt.-%) while the clay was agitated. The emulsion was sprayed onto the clay over a 45 to 60 second time period. About 2714 grams of sprayed clay was thereafter oven dried at about 105° C. for about 18 hours. About 2445 grams of oven dried clay exhibiting a Dust Index value of about 1.4 were produced.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure as those skilled in the art will appreciate.

We claim:

1. Substantially dust-free granules comprising consisting essentially of a normally dusty particulate clay material and a water-dispersible nonionic vinyl polymer distributed on the particulate material in an amount less than about 0.25 weight percent, based on the weight of the granules, but sufficient to retain dust-size particles present and provide a Dust Index for said substantially dust-free granules that is no more than about 25 percent of the Dust Index of said normally dusty particulate clay material.

2. The granules in accordance with claim 1 wherein the vinyl polymer is present in an amount in the range of about 0.05 to about 0.15 weight percent, based on the weight of the granules.

3. The granules in accordance with claim 1 wherein the vinyl polymer is selected from the group consisting of polyvinyl acetate, polyvinyl alcohol, polyvinylpyrrolidone, polyvinyloxazolidone, polyvinylmethyloxazolidone, copolymers thereof and mixtures thereof.

4. The granules in accordance with claim 3 wherein the vinyl polymer is polyvinyl acetate.

5. The granules in accordance with claim 3 wherein the vinyl polymer is a partially hydrolyzed polyvinyl acetate.

6. A substantially dust-free animal litter composition comprising discrete clay granules and a water-dispersible nonionic vinyl polymer distributed thereon in an amount less than about 0.25 weight percent, based on the weight of the granules, but sufficient to retain dust-size particles present and provide a Dust Index for said substantially dust-free animal litter composition that is no more than about 25 percent of the Dust Index of said discrete clay granules.

7. The animal litter composition in accordance with claim 6 wherein the vinyl polymer is present in an amount in the range of about 0.05 to about 0.15 weight percent, based on the weight of the granules.

8. The animal litter composition in accordance with claim 6 wherein the vinyl polymer is a polyvinyl acetate.

9. A method of producing substantially dust-free granules of a particulate clay material comprising the step of distributing onto a normally dusty particulate clay material a water-dispersible nonionic vinyl polymer in an amount less than about 0.25 weight percent, based on the weight of the granules, but effective to reduce the Dust Index of said normally dusty clay material by at least about 75 percent while maintaining said substantially dust-free granules of a particulate clay material in granular form.

10. The method in accordance with claim 9 wherein the distributing step includes spraying the vinyl polymer as an aqueous emulsion onto the solid and then agitating the sprayed solid material.

11. The method in accordance with claim 9 wherein the clay is a calcium bentonite.

12. The method in accordance with claim 9 wherein the clay is a hormite.

* * * * *